(12) United States Patent
Wolters et al.

(10) Patent No.: US 9,073,280 B2
(45) Date of Patent: Jul. 7, 2015

(54) CONTAINER FORMED FROM A ROLL AND HAVING IMPROVED OPENING PROPERTIES AS A RESULT OF STRETCHING HEAT TREATMENT OF POLYMER LAYERS

(75) Inventors: Michael Wolters, Heinsberg (DE); Günther Lorenz, Übach-Palenberg (DE); Holger Schmidt, Inden-Lamersdorf (DE); Jörg Bischoff, Hückelhoven (DE)

(73) Assignee: SIG Technology AG, Neuhausen (CH)

( * ) Notice: Subject to any disclaimer, the term of this patent is extended or adjusted under 35 U.S.C. 154(b) by 147 days.

(21) Appl. No.: 13/814,387

(22) PCT Filed: Aug. 4, 2011

(86) PCT No.: PCT/EP2011/003922
§ 371 (c)(1),
(2), (4) Date: Apr. 15, 2013

(87) PCT Pub. No.: WO2012/016705
PCT Pub. Date: Feb. 9, 2012

(65) Prior Publication Data
US 2013/0196102 A1 Aug. 1, 2013

(30) Foreign Application Priority Data
Aug. 5, 2010 (DE) .................. 10 2010 033 465

(51) Int. Cl.
| | | |
|---|---|---|
| B32B 1/02 | (2006.01) | |
| B31B 1/00 | (2006.01) | |
| B31B 17/00 | (2006.01) | |
| B32B 38/00 | (2006.01) | |
| B32B 38/04 | (2006.01) | |
| B65D 5/74 | (2006.01) | |
| B65D 5/56 | (2006.01) | |
| B65D 5/62 | (2006.01) | |

(52) U.S. Cl.
CPC ........... *B31B 17/00* (2013.01); *Y10T 428/1352* (2015.01); *Y10T 428/1383* (2015.01); *B31B 2201/22* (2013.01); *B32B 38/0036* (2013.01); *B32B 38/04* (2013.01); *B32B 2439/40* (2013.01); *B65D 5/746* (2013.01); *B65D 5/563* (2013.01); *B65D 5/62* (2013.01)

(58) Field of Classification Search
CPC ............ B31B 2201/00; B31B 2201/22; B32B 38/0036; B65D 5/563; Y10T 428/1352; Y10T 428/1383
USPC ........ 493/51, 52, 56, 63, 148; 428/35.7–35.9, 428/36.4, 36.6, 36.7
See application file for complete search history.

(56) References Cited

U.S. PATENT DOCUMENTS

| | | |
|---|---|---|
| 6,872,459 B1 | 3/2005 | Frisk et al. |
| 2005/0175800 A1 | 8/2005 | Staffetti et al. |
| 2008/0299403 A1 | 12/2008 | Shearer et al. |

FOREIGN PATENT DOCUMENTS

| | | |
|---|---|---|
| EP | 0 575 703 A1 | 12/1993 |
| EP | 1 507 660 A | 2/2005 |
| EP | 1 507 661 A | 2/2005 |
| EP | 1 570 660 A | 9/2005 |
| WO | 90/09926 A2 | 9/1990 |
| WO | 98/14317 A1 | 4/1998 |
| WO | 03/095199 A1 | 11/2003 |
| WO | 03/095200 A1 | 11/2003 |
| WO | 2010/023859 A1 | 3/2010 |
| WO | 2012/016701 | 2/2012 |
| WO | 2012/016702 | 2/2012 |
| WO | 2012/016705 | 2/2012 |

OTHER PUBLICATIONS

Related copending U.S. Appl. No. 13/814,361, filed Apr. 16, 2013 (and its prosecution history).
Related copending U.S. Appl. No. 13/814,390, filed Apr. 22, 2013 (and its prosecution history).
International Preliminary Report on Patentability, mailed Feb. 5, 2013, in International Application No. PCT/EP2011/003913. (English Translation).
Written Opinion, mailed Feb. 5, 2013, in International Application No. PCT/EP2011/003913. (English Translation).
International Preliminary Report on Patentability, mailed Feb. 5, 2013, in International Application No. PCT/EP2011/003914. (English Translation).
Written Opinion, mailed Feb. 5, 2013, in International Application No. PCT/EP2011/003914. (English Translation).
International Preliminary Report on Patentability, mailed Feb. 5, 2013, in International Application No. PCT/EP2011/003922. (English Translation).
Written Opinion, mailed Feb. 5, 2013, in International Application No. PCT/EP2011/003922. (English Translation).
International Patent Application No. PCT/EP2011/003913, International Search Report issued Oct. 26, 2011 (1 page).
International Patent Application No. PCT/EP2011/003914, International Search Report issued Dec. 15, 2011 (2 pages).
International Patent Application No. PCT/EP2011/003922, International Search Report issued Dec. 15, 2011 (1 page).

*Primary Examiner* — Walter B Aughenbaugh
(74) *Attorney, Agent, or Firm* — Meunier Carlin & Curfman LLC (57) ABSTRACT

Disclosed herein is a container featuring at least one hole, and process for making the same. The container is prepared from a sheet-like composite having (i) a polymer outer layer facing the surroundings; (ii) a carrier layer following the polymer outer layer in the direction of the container interior; (iii) a barrier layer following the carrier layer in the direction of the container interior; (iv) an adhesive layer following the barrier layer in the direction of the container interior; and (v) a polymer inner layer following the adhesive layer in the direction of the container interior. The sheet-like composite is prepared by laminating the individual layers, wherein at least the polymer inner layer or the adhesive layer are stretched during application.

16 Claims, 8 Drawing Sheets

CONTAINER FORMED FROM A ROLL AND HAVING IMPROVED OPENING PROPERTIES AS A RESULT OF STRETCHING HEAT TREATMENT OF POLYMER LAYERS

The present invention relates generally to a process for the production of a container which delimits a container interior from the surroundings and which is formed at least in part from a sheet-like composite, comprising the process steps
(I) provision of a sheet-like composite on a roll;
(II) formation of the container from the sheet-like composite from the roll;
(III) closing of the container.

For a long time foodstuffs, whether foodstuffs for human consumption or also animal feed products, have been preserved by being stored either in a can or in a glass jar closed with a lid. The shelf life can be increased here, for example, by sterilizing as far as possible in each case the foodstuff and the container, here the glass jar or can, separately and then filling the container with the foodstuff and closing it. However, this measure, which in itself has been proven for a long time, for increasing the shelf life of foodstuffs has a number of disadvantages, for example a downstream sterilization which is again necessary.

Because of their essentially cylindrical shape, cans and glass jars furthermore have the disadvantage that very dense and space-saving storage is not possible. Furthermore, cans and glass jars have a considerable intrinsic weight, which leads to an increased consumption of energy during transportation. A quite high consumption of energy is moreover necessary for the production of glass, tinplate or aluminium, even if the raw materials used for this originate from recycling. In the case of glass jars, an increased outlay on transportation is an additional difficulty, since these are usually prefabricated in a glassworks and must then be transported to the foodstuffs filling plant utilizing considerable transportation volumes. Glass jars and cans moreover can be opened only with a considerable application of force or with the aid of tools, and therefore rather inconveniently. In the case of cans, there is also a high risk of injury from sharp edges which arise during opening. In the case of glass jars, glass splinters are forever entering into the foodstuff during filling or opening of filled glass jars, which in the worst case can lead to internal injuries on consumption of the foodstuff.

Other packaging systems for storing foodstuffs for a long period of time as far as possible without impairment are known from the prior art. These are containers produced from sheet-like composites—often also called laminate. Such sheet-like composites are often built up from a layer of thermoplastic, a carrier layer usually made of cardboard or paper, an adhesion promoter layer, a barrier layer and a further layer of plastic, as disclosed, inter alia, in WO 90/09926 A2.

These laminated containers already have many advantages over the conventional glass jars and cans. Nevertheless, possibilities for improvement also exist for these packaging systems.

Laminated containers are thus often characterized in that they have drinking straw holes or perforations for better ease of opening. They are produced, for example, by introducing into the cardboard employed for production of the laminate holes over which the further laminated layers are laminated to form hole-covering layers which cover the hole region. This hole region can then be provided with a closure device, which when operated pushes the hole-covering layers into the container or tears them out upwards. If appropriate, a drinking straw can also simply be pushed into such a hole region. Such hole regions are known, for example, from EP-A-1 570 660 or EP-A-1 570 661. In addition to such hole regions constructed, for example, as a drinking straw hole, laminated containers can also be provided with perforations which render possible opening of the container by partial tearing open of the laminate along the perforation. Such perforations can be installed in the finished laminate, for example, by means of laser beams, in that the laser beam removes the polymer outer layer and the carrier layer at points to form a plurality of holes.

The disadvantage of the laminated containers which have such hole regions and are known to date from the prior art, however, lies in particular in the fact that during opening of the container, whether by operating a closure device, by insertion of a drinking straw or tearing open along a perforation, the hole-covering layers covering the hole region, which conventionally comprise at least the barrier layer and the layers arranged underneath, that is to say in the direction of the foodstuff filling the container, which are laminated on to the barrier layer, can be only inadequately separated off from the remaining laminate. Thread formation of the thermoplastic polymer layers often occurs here. EP-A-1 570 660 or EP-A-1 570 661 now attempt to eliminate these disadvantages via the choice of certain polymers, namely polyolefin prepared by means of metallocenes.

Generally, the object of present invention is to at least partly eliminate the disadvantages emerging from the prior art.

An object according to the invention was to provide a process with which at high production speeds of the sheet-like composite not only a few certain polymers but a number of polymers can be employed and good opening and pouring properties are nevertheless achieved.

An object according to the invention is furthermore to provide a sheet-like composite with a process for the production thereof for a container having a high tightness, it being possible for the sheet-like composite to be produced at a high speed.

An object according to the invention is moreover to provide a sheet-like composite with a process for the production thereof for a container having good opening properties, whether by closures to be opened or perforations. Here also, a high speed in the production of the composite is important.

In connection with the opening properties, the formation of threads of plastic is to be avoided in particular. Such threads are observed, for example, during opening of perforations. In the case of liquid-containing container fillings in particular, this often leads to an undesirable sticking of the liquids to these threads, which leads to imprecise pouring out with after-running. Threads spanning the opening in the form of bars can moreover lead to the foodstuff being backed up by these.

A contribution towards achieving at least one of the abovementioned objects is made by the subject matter of the classifying claims. The subject matter of the sub-claims which are dependent upon the classifying claims represents preferred embodiments of this contribution towards achieving the objects.

A contribution towards achieving the abovementioned objects is made in particular by a process for the production of a container which delimits a container interior from the surroundings and which is formed at least in part from a sheet-like composite, comprising the process steps:
(I) provision of a sheet-like composite on a roll;
(II) formation of the container from the sheet-like composite from the roll;
(III) closing of the container;

wherein the sheet-like composite comprises as composite constituents:
    a polymer outer layer facing the surroundings;
    a carrier layer following the polymer outer layer in the direction of the container interior;
    a barrier layer following the carrier layer in the direction of the container interior;
    an adhesive layer following the barrier layer in the direction of the container interior;
    a polymer inner layer following the adhesive layer in the direction of the container interior;
wherein the sheet-like composite is obtainable on a roll by a process comprising the process steps
a. provision of a composite precursor containing at least the carrier layer;
b. application of the adhesive layer and the polymer inner layer by laminating extrusion;
a. rolling up of the sheet-like composite on the roll;
wherein at least the polymer inner layer or at least the adhesive layer or at least both are stretched during the application, in particular in process step b.,
wherein the carrier layer has a hole which is covered at least with the barrier layer, the adhesive layer and the polymer inner layer as hole-covering layers, and
wherein at least one of the hole-covering layers comprising a stretched polymer is subjected to heat treatment.

In process step (I) of the process according to the invention, a sheet-like composite on a roll is first provided, which comprises as composite constituents
    a polymer outer layer facing the surroundings;
    a carrier layer following the polymer outer layer in the direction of the container interior;
    a barrier layer following the carrier layer in the direction of the container interior;
    an adhesive layer following the barrier layer in the direction of the container interior;
    a polymer inner layer following the adhesive layer in the direction of the container interior.

The wording "further layer Y following a layer X in the direction of the container interior" as used above is intended to convey that the layer Y is closer to the interior than the layer X. This wording does not necessarily say that the layer Y follows the layer X directly, but rather also includes a constellation in which one or more further layers are located between the layer X and the layer Y. According to a particular embodiment of the process according to the invention, however, the sheet-like composite is characterized in that at least the carrier layer follows the polymer outer layer directly, the adhesive layer follows the barrier layer directly and the polymer inner layer follows the adhesive layer directly.

The container according to the invention preferably has at least one, preferably between 6 and 16 edges, particularly preferably between 7 and 12 or even more edges. According to the invention, edge is understood as meaning in particular regions which, on folding of a surface, are formed by two parts of this surface lying over one another. Edges which may be mentioned by way of example are the elongated contact regions of in each case two wall surfaces of a container essentially in the shape of a rectangular parallelepiped. Such a container in the shape of a rectangular parallelepiped as a rule has 12 edges. In the container, the container walls preferably represent the surfaces of the container framed by the edges. The container walls of a container according to the invention are preferably formed to the extent of at least 50, preferably to the extent of at least 70 and moreover preferably to the extent of at least 90% of their surface from a carrier layer as part of the sheet-like composite.

Thermoplastics in particular are possible as the polymer outer layer, which conventionally has a layer thickness in a range of from 5 to 25 µm, particularly preferably in a range of from 8 to 20 µm and most preferably in a range of from 10 to 18 µm. Thermoplastics which are preferred in this connection are, in particular, those having a melting temperature in a range of from 80 to 155° C., preferably in a range of from 90 to 145° C. and particularly preferably in a range of from 95 to 135° C.

In addition to the thermoplastic polymer, the polymer outer layer can optionally also comprise an inorganic filler. All the preferably particulate solids which appear to be suitable to the person skilled in the art and which, inter alia, lead to an improved distribution of heat in the plastic and therefore to a better sealability of the plastic are possible as the inorganic filler. Preferably, the average particle sizes (d50%) of the inorganic solids, determined by sieve analysis, are in a range of from 0.1 to 10 µm, preferably in a range of from 0.5 to 5 µm and particularly preferably in a range of from 1 to 3 µm. Possible inorganic solids are, preferably, metal salts or oxides of di- to tetravalent metals. Examples which may be mentioned here are the sulphates or carbonates of calcium, barium or magnesium or titanium dioxide, preferably calcium carbonate.

In this connection, however, it is preferable for the polymer outer layer to comprise a thermoplastic polymer to the extent of at least 60 vol. %, preferably at least 80 vol. % and particularly preferably at least 95 vol. %, in each case based on the polymer outer layer.

Suitable thermoplastic polymers of the polymer outer layer are polymers obtained by chain polymerization, in particular polyolefins, among these cyclic olefin copolymers (COC), polycyclic olefin copolymers (POC), in particular polyethylene and polypropylene, being preferred and polyethylene being particularly preferred. The melt flow rates (MFR), determined by means of DIN 1133 (190° C./2.16 kg), of the thermoplastic polymers, which can also be employed as a mixture of at least two, are preferably in a range of from 1 to 25 g/10 min, preferably in a range of from 2 to 9 g/10 min and particularly preferably in a range of from 3.5 to 8 g/10 min.

Among the polyethylenes, HDPE, MDPE, LDPE, LLDPE and PE and mixtures of at least two of these are preferred for the process according to the invention. The MFR, determined by means of DIN 1133 (190° C./2.16 kg), of these polymers are preferably in a range of from 3 to 15 g/10 min, preferably in a range of from 3 to 9 g/10 min and particularly preferably in a range of from 3.5 to 8 g/10 min. In connection with the polymer outer layer, it is preferable to employ polyethylenes having a density (according to ISO 1183-1:2004) in a range of from 0.912 to 0.950 g/cm$^3$, an MFR in a range of from 2.5 to 8 g/10 min and a melting temperature (according to ISO 11357) in a range of from 96 to 135° C. Further polyethylenes which are preferred in connection with the polymer outer layer preferably have a density (according to ISO 1183-1:2004) in a range of from 0.900 to 0.960 g/cm$^3$.

A further layer or further layers may also optionally be provided on the side of the polymer outer layer facing the surroundings. In particular, a printed layer may also be applied on the side of the polymer outer layer facing the surroundings.

As the carrier layer following the polymer outer layer in the direction of the container interior, any material which is suitable for this purpose to the person skilled in the art and which has an adequate strength and rigidity to give the container stability to the extent that in the filled state the container essentially retains its shape can be employed. In addition to a number of plastics, plant-based fibrous substances, in particular celluloses, preferably sized, bleached and/or non-bleached celluloses, are preferred, paper and cardboard being particularly preferred. The weight per unit area of the carrier layer is preferably in a range of from 140 to 450 g/m², particularly preferably in a range of from 160 to 400 g/m² and most preferably in a range of from 170 to 350 g/m².

As the barrier layer following the carrier layer in the direction of the container interior, any material which is suitable for this purpose to the person skilled in the art and has an adequate barrier action, in particular against oxygen, can be employed. The barrier layer can be a metal foil, such as, for example, an aluminium foil, a metallized film or a barrier layer of plastic.

In the case of a barrier layer of plastic, this preferably comprises at least 70 wt. %, particularly preferably at least 80 wt. % and most preferably at least 95 wt. % of at least one plastic which is known to the person skilled in the art for this purpose, in particular because of aroma or gas barrier properties which are suitable for packaging containers. Preferably, thermoplastics are employed here. In the container according to the invention, it may prove advantageous if the barrier layer of plastic has a melting temperature (according to ISO 11357) in a range of from more than 155 to 300° C., preferably in a range of from 160 to 280° C. and particularly preferably in a range of from 170 to 270° C. Possible plastics, in particular thermoplastics, here are plastics carrying N or O, both by themselves and in mixtures of two or more. In the case of a barrier layer of plastic, it is furthermore preferable for this to be as far as possible homogeneous and is therefore preferably obtainable from melts, such as are formed, for example, by extrusion, in particular laminating extrusion. In contrast, barrier layers of plastic which are obtainable by deposition from a solution or dispersion of plastics are preferred less since, in particular if deposition or formation takes place from a plastics dispersion, these often have at least partly particulate structures which show gas and moisture barrier properties which are poorer compared with the barrier layers of plastic which are obtainable from melts.

Possible suitable polymers on which the barrier layers of plastic can be based are, in particular, polyamide (PA) or polyethylene/vinyl alcohol (EVOH) or a mixture thereof.

All the PAs which appear to be suitable to the person skilled in the art for the production of and use in the containers according to the invention are possible as a PA. PA 6, PA 6.6, PA 6.10, PA 6.12, PA 11 or PA 12 or a mixture of at least two of these are to be mentioned here in particular, PA 6 and PA 6.6 being particularly preferred and PA 6 being further preferred. PA 6 is commercially obtainable under the trade names Akulon®, Durethan® and Ultramid®. Amorphous polyamides, such as e.g. MXD6, Grivory® and Selar®, are moreover suitable. The molecular weight of the PA should preferably be chosen such that the molecular weight range chosen on the one hand makes a good laminating extrusion possible in the production of the sheet-like composite for the container, and on the other hand the sheet-like composite itself has adequately good mechanical properties, such as a high elongation at break, a high abrasion resistance and an adequate rigidity for the container. This results in preferred molecular weights, determined as the weight-average via gel permeation chromatography (GPC) (according to ISO/DIS 16014-3:2003) with light scattering (ISO/DIS 16014-5:2003), in a range of from $3\times10^3$ to $1\times10^7$ g/mol, preferably in a range of from $5\times10^3$ to $1\times10^6$ g/mol and particularly preferably in a range of from $6\times10^3$ to $1\times10^5$ g/mol. Furthermore, in connection with the processing and mechanical properties, it is preferable for the PA to have a density (according to ISO 1183-1:2004) in a range of from 1.01 to 1.40 g/cm³, preferably in a range of from 1.05 to 1.3 g/cm³ and particularly preferably in a range of from 1.08 to 1.25 g/cm³. It is furthermore preferable for the PA to have a viscosity number in a range of from 130 to 185 ml/g and preferably in a range of from 140 to 180 ml/g, determined in accordance with ISO 307 in 95% sulphuric acid.

All polymers which appear to be suitable to the person skilled in the art for the production and use of a container according to the invention can be employed as EVOH. Examples of suitable EVOHs are, inter alia, commercially obtainable in a large number of different configurations under the trade name EVAL™ from EVAL Europe NV, Belgium. The grades EVAL™ F104B, EVAL™ LR101B or EVAL™ LR171B appear to be particularly suitable.

Suitable EVOH grades are distinguished by at least one, particularly preferably by all of the following properties:
  an ethylene content in a range of from 20 to 60 mol %, preferably 25 to 45 mol %
  a density (according to ISO 1183-1:2004) in a range of from 1.0 to 1.4 g/cm³, preferably between 1.1 to 1.3 g/cm³
  a melting point (according to ISO 11357) in a range of from 115 to 235° C., preferably between 165 to 225° C.
  an MFR value (according to ISO 1133: 210° C./2.16 kg at a melting temperature of the EVOH of less than 230° C. and 230° C./2.16 kg at a melting temperature of the EVOH in a range of between 210 to 230° C.) in a range of from 1 to 20 g/10 min, preferably 2 to 15 g/10 min
  an oxygen permeation rate (according to ISO 14663-2 appendix C at 20° C. and 65% relative atmospheric humidity) in a range of from 0.05 to 3.2 cm³×20 μm/m²×day×atm, preferably between 0.1 to 0.6 cm³×20 μm/m²×day×atm.

In the case of the use of polyamide as the barrier layer of plastic, it is preferable for the polyamide layer to have a weight per unit area in a range of from 2 to 120 g/m², preferably in a range of from 3 to 75 g/m² and particularly preferably in a range of from 5 to 55 g/m². In this connection, it is furthermore preferable for the barrier layer of plastic to have a thickness in a range of from 2 to 90 μm, preferably a range of from 3 to 68 μm and particularly preferably in a range of from 4 to 50 μm.

Furthermore, in the case of EVOH as the barrier layer of plastic, at least one, preferably at least all of the parameters listed above for the polyamide with respect to the weight per unit area and the layer thickness are met.

However, the use of an aluminium foil which advantageously has a thickness in a range of from 3.5 to 20 μm, particularly preferably in a range of from 4 to 12 μm and very particularly preferably in a range of from 5 to 9 μm is preferred according to the invention as the barrier layer.

If an aluminium foil is employed as the barrier layer, it is furthermore preferable according to the invention for the aluminium foil to be bonded to the carrier layer via a laminating layer. In this case, with the laminating layer a further layer is thus provided between the barrier layer and the carrier layer.

Thermoplastics in particular, just as in the case of the polymer outer layer, are possible as the laminating layer, which conventionally has a layer thickness in a range of from 8 to 50 μm, particularly preferably in a range of from 10 to 40 μm and most preferably in a range of from 15 to 30 μm. Thermoplastics which are preferred in this connection are in turn those having a melting temperature (according to ISO 11357) in a range of from 80 to 155° C., preferably in a range of from 90 to 145° C. and particularly preferably in a range of from 95 to 135° C. Suitable thermoplastic polymers for the laminating layer are, in particular, polyethylene or polypropylene, the use of polyethylene being particularly preferred. Here also, HDPE, MDPE, LDPE, LLDPE, PE or a mixture of at least two of these can be employed as the polyethylene. The MFR, determined by means of DIN 1133 (190° C./2.16 kg), of the polymers which can be employed for the laminating layer are preferably in a range of from 3 to 15 g/10 min, preferably in a range of from 3 to 9 g/10 min and particularly preferably in a range of from 3.5 to 8 g/10 min. In connection with the laminating layer, it is preferable to employ a thermoplastic polymer having a density (according to ISO 1183-1:2004) in a range of from 0.912 to 0.950 g/cm$^3$, an MFR in a range of from 2.5 to 8 g/10 min and a melting temperature in a range of from 96 to 135° C. Further polyethylenes which are preferred in connection with the laminating layer preferably have a density (according to ISO 1183-1:2004) in a range of from 0.900 to 0.960 g/cm$^3$.

In the case of an aluminium foil as the barrier layer and the use of the laminating layer described above between the barrier layer and the carrier layer, an adhesion promoter layer can also be provided between the aluminium foil and the laminating layer, between the laminating layer and the carrier layer or between the laminating layer and the barrier layer and the laminating layer and the carrier layer. Possible adhesion promoters are all polymers which, by means of suitable functional groups, are capable of generating a firm join by the formation of ionic bonds or covalent bonds to the surface of the other particular layer. Preferably, these are functionalized polyolefins which have been obtained by copolymerization of ethylene with acrylic acids, such as acrylic acid, methacrylic acid, crotonic acid, acrylates, acrylate derivatives or carboxylic acid anhydrides carrying double bonds, for example maleic anhydride, or at least two of these. Among these, polyethylene/maleic anhydride graft polymers are particularly preferred, these being marketed, for example, by DuPont under the trade name Bynel®.

According to a particular embodiment of the container according to the invention, however, an adhesion promoter layer is provided neither between the laminating layer preferably based on polyethylene and the aluminium foil nor between the laminating layer preferably based on polyethylene and the carrier layer, preferably the cardboard layer.

The adhesive layer following the barrier layer in the direction of the container interior, like the adhesion promoter layer described above, is preferably based on polymers which, by means of suitable functional groups, are capable of generating a firm join, particularly preferably a chemical bond, by the formation of ionic bonds or covalent bonds to the surface of the other particular layer, in particular to the surface of the aluminium foil. Preferably, these are functionalized polyolefins which have been obtained by copolymerization of ethylene with acrylic acid, acrylates, acrylate derivatives or carboxylic acid anhydrides carrying double bonds, for example maleic anhydride, or at least two of these. Of these, polyethylene/maleic anhydride graft polymers and ethylene/acrylic acid copolymers are particularly preferred, ethylene/acrylic acid copolymers being very particularly preferred. Such copolymers are marketed, for example, by DuPont under the trade name Nucrel® or by ExxonMobil Chemical under the trade name Escor®.

The polymer inner layer following the adhesive layer in the direction of the container interior, like the polymer outer layer described above, is based on thermoplastic polymers, it being possible for the polymer inner layer, like the polymer outer layer, to comprise a particulate inorganic solid. It is preferable, however, for the polymer inner layer to comprise a thermoplastic polymer to the extent of at least 70 wt. %, preferably at least 80 wt. % and particularly preferably at least 95 wt. %, in each case based on the polymer inner layer.

In this connection, it is particularly preferable for the polymer inner layer to comprise at least 70 wt. %, particularly preferably at least 75 wt. % and most preferably at least 80 wt. %, in each case based on the polymer inner layer, of a polyolefin prepared by means of a metallocene catalyst, preferably a polyethylene prepared by means of a metallocene catalyst (mPE).

It is particularly preferable according to the invention for the polymer inner layer to be a mixture of a polyolefin prepared by means of a metallocene catalyst and a further mixture polymer, the further mixture polymer preferably being a polyethylene which has not been prepared by means of a metallocene catalyst, preferably LDPE which has not been prepared by means of a metallocene catalyst. Preferably, the polymer inner layer is a mixture of 70 to 95 wt. %, particularly preferably 75 to 85 wt. % of mPE and 5 to 30 wt. %, particularly preferably 15 to 25 wt. % of LDPE.

Preferably, the polymer or the polymer mixture of the polymer inner layer has a density (according to ISO 1183-1:2004) in a range of from 0.900 to 0.930 g/cm$^3$, particularly preferably in a range of from 0.900 to 0.920 g/cm$^3$ and most preferably in a range of from 0.900 to 0.910 g/cm$^3$, while the MFR (ISO 1133, 190° C./2.16 kg) is preferably in a range of from 4 to 17 g/10 min, particularly preferably in a range of from 4.5 to 14 g/10 min and most preferably in a range of from 6.5 to 10 g/10 min.

According to a particularly preferred embodiment of the container according to the invention, the polymer inner layer follows the adhesive layer directly. Accordingly, no further layer, in particular no further layer based on polyethylene, very particularly preferably no further LDPE or HDPE layer, is provided between the polymer inner layer preferably comprising mPE and the adhesive layer.

According to a particular embodiment of the process according to the invention, in the sheet-like composite the layer thickness of the adhesive layer $LT_{AL}$ is greater than the layer thickness of the polymer inner layer $LT_{PIL}$. In this context, it is particularly preferable for the layer thickness of the adhesive layer $LT_{AL}$ to be greater than the layer thickness of the polymer inner layer $LT_{PIL}$ by a factor in a range of from 1.1 to 5, still more preferably in a range of from 1.2 to 4 and most preferably in a range of from 1.3 to 3.5.

The total thickness of the adhesive layer and the polymer inner layer is often in the range of from 10 to 120 µm, preferably in a range of from 15 to 80 µm and particularly preferably in a range of from 18 to 60 µm. The preferred layer thicknesses of the individual two layers are deduced from the above factors.

In the process according to the invention, the sheet-like composite is provided on a roll.

In order to facilitate the ease of opening of the container produced by the process according to the invention, the carrier layer has at least one hole which is covered at least with the barrier layer, the adhesive layer and the polymer inner layer as hole-covering layers.

According to a first particular embodiment of the process according to the invention, it is preferable for the carrier layer to have a hole which is covered at least with the polymer outer layer, the barrier layer, the adhesive layer and the polymer inner layer as hole-covering layers. Such an embodiment of a composite is described, for example, in EP-A-1 507 660 and EP-A-1 507 661, but there a further layer, preferably based on LDPE, is provided between the polymer inner layer and the adhesive layer.

In connection with this first particular embodiment of the process according to the invention, the hole provided in the carrier layer can have any form which is known to the person skilled in the art and is suitable for various closures or drinking straws. The hole often has rounded edges in plan view. The hole can thus be essentially circular, oval, elliptical or tear-shaped. The shape of the hole in the carrier layer usually also predetermines the shape of the opening, which is generated in the container either by an openable closure joined to the container, through which the contents of the container are removed from the container after the opening, or by a drinking straw. The openings of the opened container therefore often have shapes which are comparable to or even the same as the hole in the carrier layer.

In connection with the covering of the hole of the carrier layer, in connection with the first particular embodiment of the process according to the invention it is preferable for the hole-covering layers to be joined to one another at least partly, preferably over to the extent of at least 30%, preferably at least 70% and particularly preferably to the extent of at least 90% of the area formed by the hole. It is furthermore preferable for the hole-covering layers to be joined to one another in the region of the hole edges surrounding the hole, and preferably to be joined adjacent to the hole edge, in order thus to achieve an improved tightness over a join extending over the entire hole area. The hole-covering layers are often joined to one another over the region formed by the hole in the carrier layer. This leads to a good tightness of the container formed from the composite and therefore to the desired high shelf life of the foodstuffs kept in the container.

The opening of the container is usually generated by at least partial destruction of the hole-covering layers covering the hole. This destruction can be effected by cutting, pressing into the container or pulling out of the container. The destruction and therefore the opening can be effected by a closure which is joined to the container, is arranged in the region of the hole, usually above the hole, and perforates the hole-covering layers, or a drinking straw which is pushed through the hole-covering layers covering the hole.

According to a second particular embodiment of the process according to the invention, it is preferable for the carrier layer to have a plurality of holes in the form of a perforation, the individual holes being covered at least with the barrier layer, the adhesive layer and the polymer inner layer as hole-covering layers. The container can then be opened by tearing open along the perforation. In principle, the holes in the carrier layer, which preferably also all extend over the carrier layer in the direction of the layers lying to the surroundings (polymer outer layer and optionally printed layer), can have any shape which appears to be suitable to the person skilled in the art for configuration of a region to be opened in the container according to the invention. However, holes which are circular or elongated in plan view and preferably run along a line which forms a perforation in a container wall of the container according to the invention are preferred. Such perforations are preferably generated by means of a laser, which removes the layers formerly located in the hole. It is furthermore possible for the perforation to be constructed overall as a linear weakness in the sheet-like composite which, in the region of the weakness, has groups of sections having a smaller layer thickness compared to the weakness. These perforations are preferably obtained by mechanical perforation tools usually having blades. The result of this in particular is that the container produced by the process according to the invention can be opened without excessive force or even the aid of a tool and with a lower risk of injury by tearing open the container wall of the container according to the invention along the perforation formed in this way.

Both in the first and in the second particular embodiment it can be envisaged that no polymer outer layer or printed layer is provided in the region of the hole(s) in the direction of the surroundings of the container. Rather, in this variant of the two embodiments it is preferable for the barrier layer to be in contact with the surroundings without a further layer of plastic, such as the polymer outer layer. This is preferably effected by nicking, cutting or stamping or a combination of at least two of these measures on the layers pointing from the barrier layer to the surroundings. It is preferable here for at least one of these measures to be carried out by a laser. The use of laser beams is particularly preferred if a metal foil or a metallized film is employed as the barrier layer. Perforations in particular for easy tearing open of the container can be generated in this way.

In the process according to the invention it is furthermore preferable for the container to be filled with a foodstuff before closing.

The filling can be carried out in principle by any procedure which is familiar to the person skilled in the art and suitable for this purpose. On the one hand, the foodstuff and the container can be sterilized separately, before the filling, to the greatest degree possible by suitable measures such as treatment of the container with $H_2O_2$ or UV radiation or other suitable high-energy radiation or plasma treatment or a combination of at least two of these and heating of the foodstuff. This type of filling is often called "aseptic filling" and is preferred according to the invention. In addition to or also instead of the aseptic filling, it is furthermore a widespread procedure to heat the container which has been filled with foodstuff and closed, to reduce the germ count. This is preferably carried out by autoclaving. Less sterile foodstuffs and containers can also be employed in this procedure.

The sheet-like composite on a roll provided in the first process step of the process according to the invention is obtainable by a process comprising the process steps:
a. provision of a composite precursor containing at least the carrier layer;
b. application of the adhesive layer and the polymer inner layer by melt coating, preferably by extrusion coating;
c. rolling up of the sheet-like composite on the roll;
wherein at least the polymer inner layer or at least the adhesive layer or both are stretched during the application, preferably in process step b., preferably by melt stretching.

In process step a., a composite precursor containing at least the carrier layer is first produced. Preferably, this composite precursor is a laminate comprising the polymer outer layer, the carrier layer and the barrier layer. If the barrier layer is a metal foil, such as an aluminium foil, or a metallized film, the composite precursor also comprises the laminating layer described above. The composite precursor can also optionally comprise a printed layer applied to the polymer outer layer. With respect to the hole in the carrier layer, there are various production possibilities for the composite precursor according to the invention.

According to one process variant, a carrier layer which already contains the hole can be initially taken. The further layers, in particular the polymer outer layer and the barrier layer or the laminating layer, can then be laminated on to this carrier layer such that these layers at least partly but preferably completely cover the holes. In the region covering the hole, the polymer outer layer can then be laminated directly on to the barrier layer or the laminating layer, as is described, for example, in EP-A-1 570 660 or EP-A-1 570 661.

According to another procedure, the composite precursor can first be produced employing a carrier layer which does not yet contain holes and holes can then be introduced into the carrier layer by cutting, by laser treatment or by stamping, it being possible for this measure optionally also to be carried out only after process step b. For the production in particular of a perforation, it is preferable for the polymer outer layer, the carrier layer and the barrier layer, or in the case of the use of an aluminium foil the composite precursor comprising the polymer outer layer the carrier layer, the laminating layer and the barrier layer, to be treated on the side of the polymer outer layer with a laser such that a plurality of holes which include the polymer outer layer and the carrier layer are formed in the form of a perforation.

In process step b. of the process according to the invention, the adhesive layer and the polymer inner layer are then applied by melt coating, preferably by extrusion coating, the adhesive layer being applied to the barrier layer and the polymer inner layer subsequently being applied to the adhesive layer. For this, the thermoplastic polymer forming the adhesive layer or the polymer inner layer is melted in an extruder and is applied in the molten state in the form of a flat coating to the composite precursor. The extrusion can be carried out in individual layers by a series of individual extruders following one another, or also in multiple layers by coextrusion.

According to a further embodiment, the melt coating can also be carried out by first joining the adhesive layer and the polymer inner layer to form a precursor layer and then applying this to the carrier layer. This application can be carried out on the one hand by superficial melting of the surface of the precursor layer or on the other hand by employing a further adhesion promoter, which is preferably in the form of a melt. The precursor layer can be effected by any process which appears to be suitable to the person skilled in the art for the production of thin two-fold and multiple layers, film blow moulding, in which stretching and therefore orientation can be established, being particularly preferred as the process. By this means, this precursor layer can be employed as roll goods, which can be produced independently of the production process for the composite according to the invention.

In the production of the sheet-like composite on a roll, at least the polymer inner layer or at least the adhesive layer or at least both layers are stretched during the application, this stretching preferably being carried out by melt stretching, very particularly preferably by monoaxial melt stretching. For this, the corresponding layer is applied in the molten state to the composite precursor by means of a melt extruder and the layer applied, which is still in the molten state, is then stretched in preferably the monoaxial direction in order to achieve an orientation of the polymer in this direction. The layer applied is then allowed to cool for the purpose of thermofixing. If both the adhesive layer and the polymer inner layer are stretched, this operation can be correspondingly repeated twice, first with the adhesive layer and then with the polymer inner layer. In another embodiment, this can be carried out by coextrusion of two and more layers simultaneously.

In this connection, it is particularly preferable for the stretching to be carried out by at least the following application steps:

b1. emergence at least of the polymer inner layer or at least of the adhesive layer or at least of both layers as at least one melt film via at least one extruder slot with an exit speed $V_{exit}$;

b2. application of the at least one melt film to the composite precursor moving relative to the at least one extruder slot with a moving speed $V_{adv}$;

where $V_{exit}<V_{adv}$. It is particularly preferable for $V_{adv}$ to be greater than $V_{exit}$ by a factor in the range of from 5 to 200, particularly preferably in a range of from 7 to 150, moreover preferably in a range of from 10 to 50 and most preferably in a range of from 15 to 35. In this context, it is preferable for $V_{adv}$ to be at least 100 m/min, particularly preferably at least 200 m/min and very particularly preferably at least 350 m/min, but conventionally not to lie above 1,300 m/min.

According to the invention, the stretching of the adhesive layer, of the polymer inner layer or of these two layers is accordingly achieved by a procedure in which the composite precursor on to which these layers are applied by melt extrusion is moved away from the extruder at a speed, relative to the exit speed of the melt from the extruder, which is greater than the exit speed of the melt, as a result of which stretching of the melt film occurs.

The slot width in the melt extruder in this context is preferably in a range of from 0.2 to 1.5 mm, particularly preferably in a range of from 0.4 to 1.0 mm, so that the exit thickness of the melt on leaving the extruder slot is preferably in a range of from 0.2 to 1.5 mm, particularly preferably in a range of from 0.4 to 1.0 mm, while the thickness of the melt layer (adhesive layer or polymer inner layer) applied to the composite precursor is in a range of from 5 to 100 μm, particularly preferably in a range of from 7 to 50 μm. By the stretching, a significant reduction in the layer thickness of the melt layer thus occurs from the region of exit from the melt extruder to the melt layer in contact on the composite precursor due to application.

In this connection it is furthermore preferable for the melt to have a temperature in a range of from 200 to 360° C., particularly preferably in a range of from 250 to 320° C., on exit from the melt extruder.

It is furthermore preferable for the stretching on a carrier layer formed from fibres, for example paper or cardboard, to be carried out in the direction of the fibre direction. In the present case, the fibre direction is understood as meaning the direction in which the carrier layer has the lowest flexural strength. This is often the so-called machine direction, in which the carrier layer, if this is paper or cardboard, is produced. This measure can lead to improved opening properties.

After the melt layer has been applied to the composite precursor by means of the stretching process described above, the melt layer is allowed to cool for the purpose of thermofixing, this cooling preferably being carried out by quenching via contact with a surface which is kept at a temperature in a range of from 5 to 50° C., particularly preferably in a range of from 10 to 30° C. The duration of this bringing into contact of the composite precursor covered with the melt film with the temperature-controlled surface is preferably in a range of from 2 to 0.15 ms, particularly preferably in a range of from 1 to 0.2 ms.

A sheet-like composite in which at least the polymer inner layer or at least the adhesive layer or at least both layers comprise a stretched polymer to the extent of at least 50 wt. %, particularly preferably to the extent of at least 65 wt. % and most preferably to the extent of at least 80 wt. %, in each case based on the particular layer, is obtained in the manner described above.

In process step c., the sheet-like composite obtained in process step b. is then rolled up on a roll.

In process step (II) of the process according to the invention for the production of a container, a container is then formed from the sheet-like composite provided in process step (I) on a roll.

For this, the sheet-like composite is preferably unrolled continuously from the roll. From the unrolled part of the sheet-like composite, a tubular structure having a fixed longitudinal seam is then formed preferably continuously by folding and sealing or gluing the overlapping borders. This tubular structure is compressed laterally, fixed and separated and formed into an open container by folding and sealing or gluing. The foodstuff here can already be filled into the container after the fixing and before the separation and folding of the base. This can be carried out, for example, on a device described in WO 2010/023859 in FIG. 3.

According to the invention, in this context "folding" is understood as meaning an operation in which preferably an elongated kink forming an angle is generated in the folded sheet-like composite by means of a folding edge of a folding tool. For this, two adjacent surfaces of a sheet-like composite are often bent ever more towards one another. By the fold, at least two adjacent fold surfaces are formed, which are then joined at least in part regions to form a container region. According to the invention, the joining can be effected by any measure which appears to be suitable to the person skilled in the art and which renders possible a join which is as gas- and liquid-tight as possible. The joining can be carried out by sealing or gluing or a combination of the two measures. In the case of sealing, the join is created by means of a liquid and solidification thereof. In the case of gluing, chemical bonds which create the join form between the boundary faces or surfaces of the two objects to be joined. In the case of sealing or gluing, it is often advantageous for the surfaces to be sealed or glued to be pressed together with one another.

The sealing temperature is preferably chosen such that the plastic(s) involved in the sealing, preferably the polymers of the polymer outer layer and/or of the polymer inner layer, are present as a melt. Furthermore, the sealing temperature chosen should not be too high, in order that the exposure of the plastic(s) to heat is not unnecessarily severe, so that these do not lose their envisaged material properties. The sealing temperatures are conventionally at least 1 K, preferably at least 5 K and particularly preferably at least 10 K above the melting temperature of the particular plastic.

In process step (III) of the process according to the invention, the container is then closed, this closing likewise preferably being carried out by gluing or sealing.

Figure 3:
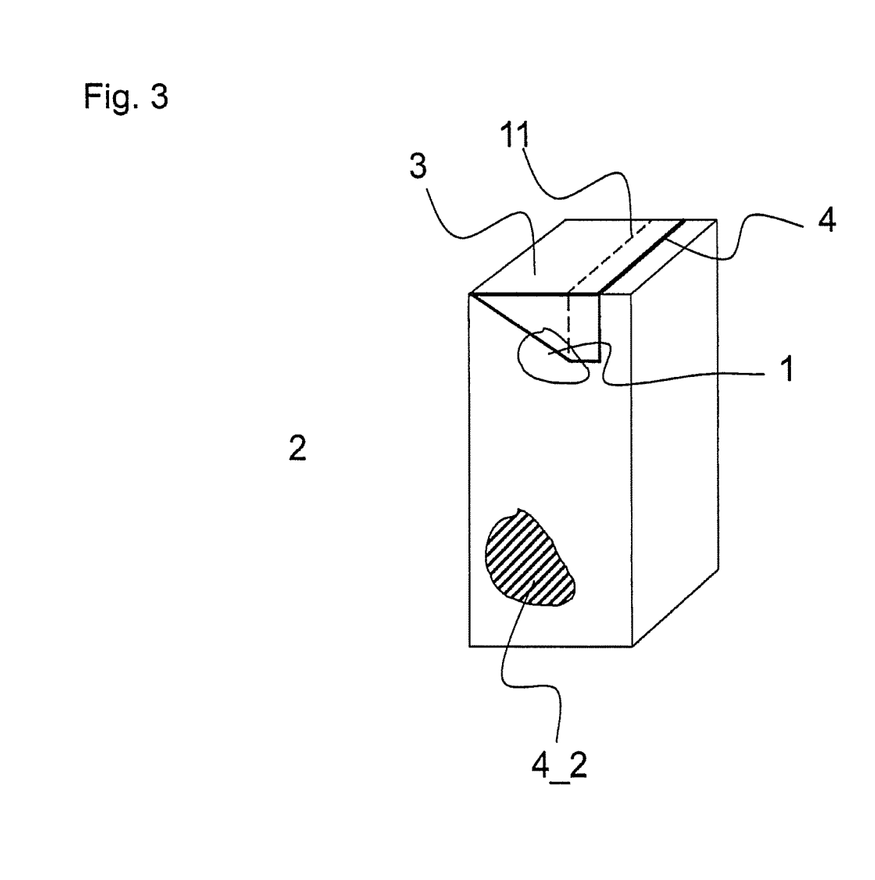

A process which comprises process steps (II) and (III) of the process according to the invention and in which a closed packaging container is formed in the manner described above from a sheet-like composite rolled up on a roll can be seen, for example, from FIG. 3 of WO-A-2010/023859.

Before process step (III) is carried out, the container can be filled with a foodstuff. All the foodstuffs known to the person skilled in the art for human consumption and also animal feeds are possible as the foodstuff. Preferred foodstuffs are liquid above 5° C., for example drinks. Preferred foodstuffs are dairy products, soups, sauces, non-carbonated drinks, such as fruit drinks and juices or teas. The foodstuffs can on the one hand be sterilized beforehand and filled into containers which have likewise been sterilized beforehand, or enclosed in a sheet-like composite which has likewise been sterilized beforehand. The foodstuffs can furthermore be disinfected after filling or enclosing. This is carried out, for example, by autoclaving.

According to the invention, at least one of the hole-covering layers comprising a stretched polymer is now subjected to heat treatment. The purpose of this heat treatment is to effect an at least partial elimination of the orientation of the polymers in the adhesive layer, in the polymer inner layer or in both layers, in particular in the hole region. This heat treatment has the effect of an improved ease of opening of the container. In the case of several holes present in the carrier layer in the form of a perforation, it is particularly preferable for this heat treatment to be carried out around the edge region of the hole.

The heat treatment can be carried out by electromagnetic radiation, by treatment with hot gas, by thermal contact with a solid, by ultrasound or by a combination of at least two of these measures.

In the case of irradiation, any type of radiation which is suitable to the person skilled in the art for softening the plastics is possible. Preferred types of radiation are IR rays, UV rays and microwaves. Preferred types of vibration are ultrasound. In the case of IR rays, which are also employed for IR welding of sheet-like composites, wavelength ranges of from 0.7 to 5 μm are to be mentioned. Laser beams in a wavelength range of from 0.6 to less than 10.6 μm can furthermore be employed. In connection with the use of IR rays, these are generated by various suitable lamps which are known to the person skilled in the art. Short wavelength lamps in the range of from 1 to 1.6 μm are preferably halogen lamps. Medium wavelength lamps in the range of from >1.6 to 3.5 μm are, for example, metal foil lamps. Quartz lamps are often employed as long wavelength lamps in the range of >3.5 μm. Lasers are ever more often employed. Thus, diode lasers are employed in a wavelength range of from 0.8 to 1 μm, Nd:YAG lasers at about 1 μm and $CO_2$ lasers at about 10.6 μm. High frequency techniques with a frequency range of from 10 to 45 MHz, often in a power range of from 0.1 to 100 kW, are also employed.

In the case of ultrasound, the following treatment parameters are preferred:

P1 a frequency in a range of from 5 to 100 kHz, preferably in a range of from 10 to 50 kHz and particularly preferably in a range of from 15 to 40 kHz;

P2 an amplitude in the range of from 2 to 100 μm, preferably in a range of from 5 to 70 μm and particularly preferably in a range of from 10 to 50 μm;

P3 a vibration time (as the period of time in which a vibrating body, such as a sonotrode or inductor, acts in contact vibration on the sheet-like composite) in a range of from 50 to 1,000 msec, preferably in a range of from 100 to 600 msec and particularly preferably in a range of from 150 to 300 msec.

For a suitable choice of the radiation or vibration conditions, it is advantageous to take into account the intrinsic resonances of the plastics and to choose frequencies close to these.

Heating via contact with a solid can be effected, for example, by a heating plate or heating mould which is in direct contact with the sheet-like composite and releases the heat to the sheet-like composite. Hot air can be directed on to the sheet-like composite by suitable fans, outlets or nozzles or a combination thereof. Contact heating and hot gas are often employed simultaneously. Thus, for example, a holding device which holds a tube formed from the sheet-like composite and through which hot gas flows, and which is thereby heated up and releases the hot gas through suitable openings, can heat the sheet-like composite by contact with the wall of the holding device and the hot gas. Furthermore, the tube can also be heated by fixing the tube with a tube holder and directing a flow from one or two and more hot gas nozzles provided in the tube holder on to the regions of the tube to be heated.

Preferably, the adhesive layer or the polymer inner layer is heated to a surface temperature in a range of from 70 to 260° C., particularly preferably in a range of from 80 to 220° C., by the heat treatment described above in order to at least partly reduce the orientation of the polymers in this layer or in these two layers. The surface temperature is determined by employing an IR measuring device of the type of LAND Cyclops TI35+ thermal imaging camera, scanning system with 8-sided polygonal mirror, 25 Hz at a measurement angle to the flat-lying sample of 45° (adjustable via a tripod) at a distance from the lens ring to the polymer inner layer of 240 mm and an emission factor of 1. Preferably, the surface temperature is generated by hot air having a temperature in the range of from 200 to 500° C. and particularly preferably in a range of from 250 to 400° C., in each case over a treatment period in a range of from 0.1 to 5 sec and particularly preferably in a range of from 0.5 to 3 sec. This is particularly preferred for the treatment of hole regions.

In a further embodiment of the process according to the invention, it is preferable for the heat treatment to be carried out by electromagnetic induction. It is preferable here for the inductor to be provided on the surface of the sheet-like composite which, in the container formed therefrom, faces the surroundings. In connection with the treatment by electromagnetic radiation, in particular by electromagnetic induction, it is preferable for at least one, preferably each of the following operating parameters to be realized:
i. starting voltage in a range of from 30 to 120 $V_{eff}$ and preferably in a range of from 45 to 90 $V_{eff}$;
ii. starting current in a range of from 10 to 70 A and preferably in a range of from 25 to 50 A;
iii. starting power in a range of from 0.5 to 10 kW and preferably in a range of from 1 to 5 kW;
iv. starting frequency in a range of from 10 to 1,000 kHz and preferably in a range of from 50 to 500 kHz;
v. distance between inductor surface and composite surface in a range of from 0.3 to 3 mm and preferably in a range of from 0.5 to 2 mm.

These operating conditions are achieved, for example, by an induction generator and oscillator of the "i-class" type from Cobes GmbH, Germany. A linear inductor is furthermore preferably employed according to the invention for the treatment. The area to be treated on the sheet-like composite is moved past this, this preferably being carried out with speeds of at least 50 m/min, but usually not more than 500 m/min. Speeds in a range of from 100 to 300 m/min are often achieved.

In the process according to the invention, it is furthermore preferable for the maximum transmission intensity of at least one of the hole-covering layers comprising a stretched polymer to differ before and after the heat treatment. This can conventionally be ascertained by different representations of the region viewed through a polarization filter. The heat-treated regions thus differ by light-dark contrasts from the regions on a surface which are adjacent to these but have not been heat-treated. The same applies to regions before and after the heat treatment. In this connection, it is further preferable for the at least one hole-covering layer to be the polymer inner layer. It is moreover preferable for the barrier layer to be a metal foil or a metallized layer of plastic. The polymer layer heat-treated in regions, usually the polymer inner layer of the container formed later, is provided over this, so that the barrier layer shows through. Moreover, a difference in gloss is generally to be detected due to the change in structure of the polymer inner layer originating from the heat treatment, compared with that which has not been heat-treated. The regions of different gloss coincide with the heat-treated regions of the surface of the polymer inner layer.

In addition to the hole-covering layers, still further regions of the sheet-like composite can also be subjected to heat treatment. These also show a different maximum transmission intensity compared with the non-treated regions. These include all regions in which joining by sealing is carried out and/or scores for folding are provided. Among these regions, the longitudinal seams at which the sheet-like composite is formed into a tubular or jacket-like structure are particularly preferred. After the above heat treatment, the heat-treated regions can be allowed to cool again.

According to a particular embodiment of the process according to the invention, the heat treatment of at least one of the hole-covering layers comprising a stretched polymer is carried out in the manner described above before process step (II) and therefore before the formation of the container. In particular, it may be advantageous to carry out the heat treatment even before process step c. is carried out, that is to say before rolling up of the sheet-like composite on the roll.

A further contribution towards achieving at least one of the above objects is made by a container obtainable by the process according to the invention. The embodiments of the product features dealt with above for the process according to the invention also apply to this container and therefore do not require separate repetition.

A further contribution towards achieving at least one of the above objects is made by a sheet-like composite in the form of a roll, comprising as composite constituents:
a polymer outer layer;
a carrier layer following the polymer outer layer;
a barrier layer following the carrier layer;
an adhesive layer following the barrier layer;
a polymer inner layer following the adhesive layer;
wherein the maximum transmission intensities of at least two regions (R1, R2) of the surface of the polymer inner layer differ.

Preferably, these regions form the polymer inner layers of the hole-covering layers. In addition to the hole-covering layers, still further regions of the sheet-like composite can also be subjected to heat treatment. In the sheet-like composite according to the invention, it is preferable for the polymer inner layer to comprise a less orientated plastic in the one of the at least two regions (R1, R2) compared with the further of the at least two regions (R1, R2). These show a different maximum transmission intensity compared with the non-treated regions. These include all regions in which joining by sealing is carried out and/or scores for folding are provided. Among these regions, the longitudinal seams at which the sheet-like composite is formed into a tubular or jacket-like structure are particularly preferred. The regions are usually strip- or web-like in configuration. Thus, for example, in the case of a perforation formed from a plurality of holes, the polymer inner layers of the hole-covering layers of the perforation lie in a web. In one embodiment, it is therefore preferable for an at least 1 mm wide region, starting from the hole edge, to be subjected to heat treatment. In some cases, in particular in the case of perforations, this region measured from the hole edge is up to 10 mm wide. In a further embodiment, it is preferable for at least 60%, preferably at least 80% of the area included in the hole edge to be subjected to heat treatment.

The invention furthermore relates to a container formed to the extent of more than 50 wt. %, based on the total weight of the empty container, from a sheet-like composite according to the invention. Here also, the above statements regarding the container according to the invention apply, so that these do not have to be repeated separately here.

Test Methods

Unless specified otherwise herein, the parameters mentioned herein are measured by means of DIN specifications.

The maximum transmission intensity is determined by laying an IFK-P-W76 polarization filter film from Schneider Optik GmbH on an area to be tested. The film is rotated on the area to be tested until the differences in the maximum transmission intensity are detectable with the maximum light-dark contrast.

FIGURES

The present invention is now explained in more detail by drawings given by way of example which do not limit this, the figures showing 1 a diagram of a container produced by the process according to the invention having a covered hole, 2 a diagram of a hole covered with hole-covering layers and having an openable closure with opening means as parts of a closure system, 3 a diagram of a container produced by the process according to the invention having a plurality of holes in the carrier layer in the form of a perforation, 4 a diagram of a preferred embodiment of the sheet-like composite employed for the production of this container, 5 a diagram of a further preferred embodiment of the sheet-like composite employed for the production of this container, 6 a diagram of a roll web, 7 a diagram of a suitable process for application of the adhesive layer and/or the polymer inner layer by means of melt stretching, 8 a diagram of a process for establishing a heat treatment by means of an inductor.

Figure 1:
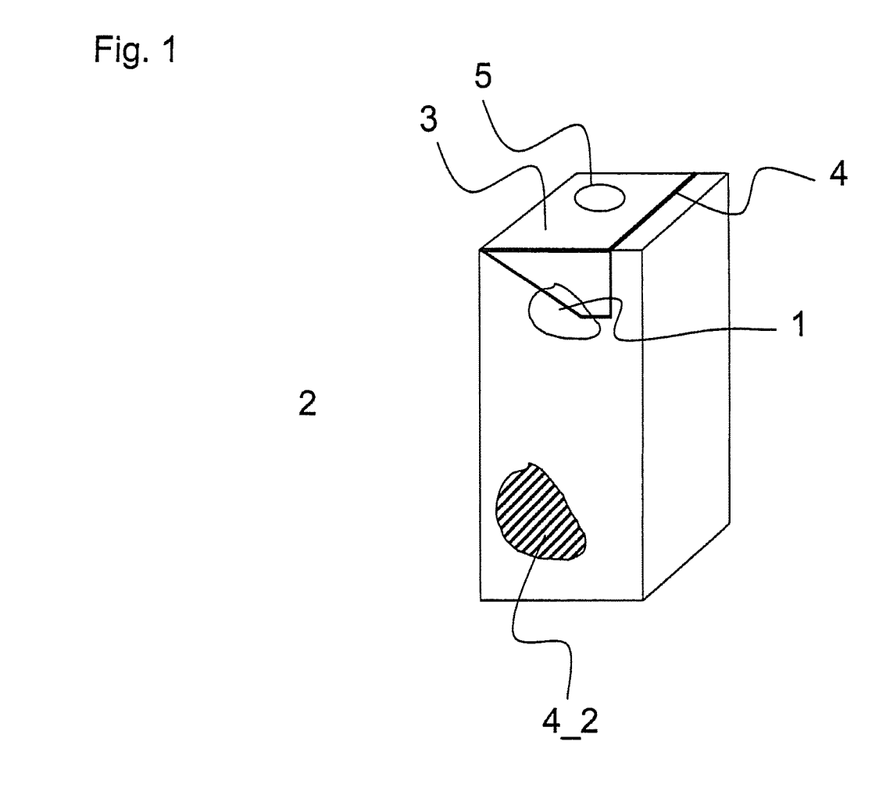

FIG. 1 shows a container 3 surrounding an interior 1 and made of a sheet-like composite 4, which separates a foodstuff enclosed therein from the surroundings 2. In the container, a covered hole 5 is provided in the top region, over which an openable closure (not shown) can be provided.

Figure 2:
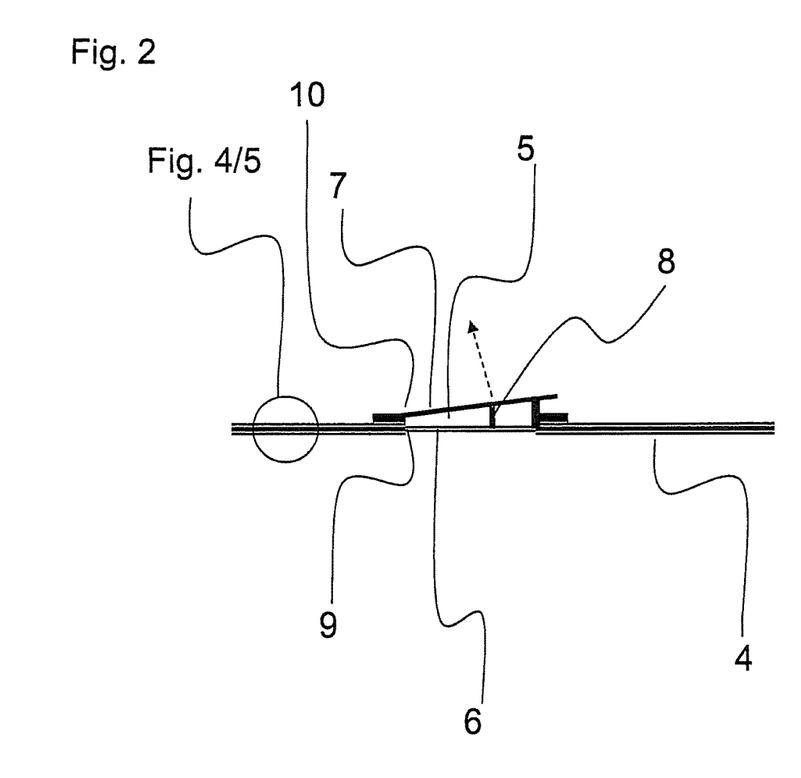

FIG. 2 shows a diagram of the cross-section of a section of the top region of a container 3 according to the invention. A sheet-like composite 4 with the details of the layered structure shown in FIG. 4 or 5 has a hole 5 which is delimited via a hole edge 9. In the hole 5 are hole-covering layers 6 which comprise at least the barrier layer 4_3, the adhesive layer 4_4 and the polymer inner layer 4_5. Due to the absence of the carrier layer 4_2 in the region of the hole 5, the hole-covering layers 6 surround, along the hole edge 9 in a moisture-tight manner, the carrier layer 4_2 extending to the hole edge 9 and cover the hole 5, so that the container 3 is closed off in a manner which is as liquid- and gas-tight as possible. On the outside of the container 3 an openable closure 7 covering the hole 5 is provided. The closure 7 has an opening means 8, which is joined to the hole-covering layers 6 and can be swivelled via a joint 10 in the direction of the broken arrow. When the opening means 8 is swivelled in the direction of the arrow, the hole-covering layers 6 are torn open and the closed container 3 is opened in this way.

FIG. 3 shows a particular embodiment of a container 3 produced by the process according to the invention, in which, in contrast to the container 3 shown in FIG. 1, a plurality of holes are provided on the upper side of the container 3 along a line 11, which form a perforation for easy opening of the container 3.

Figure 4:
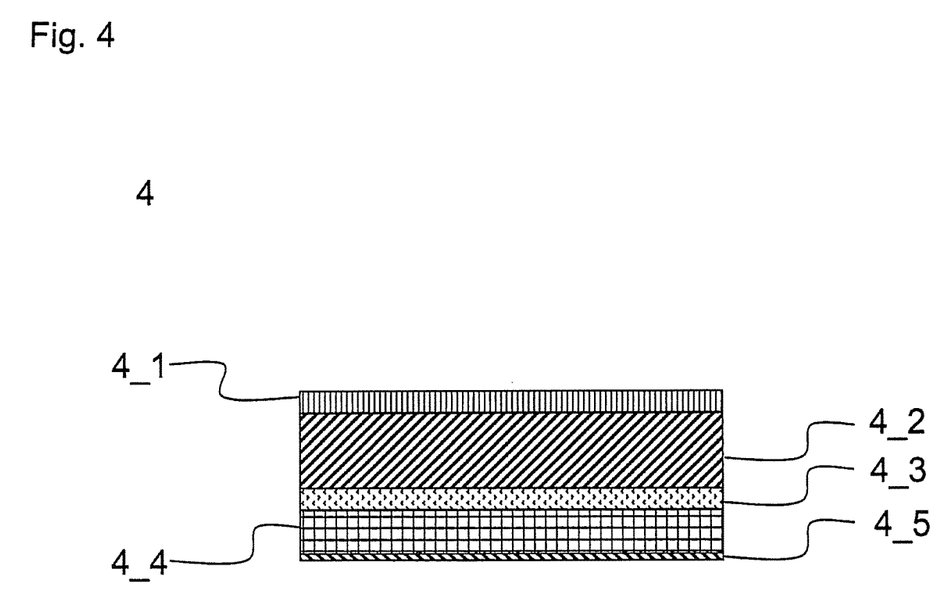

FIG. 4 shows the layered structure of the sheet-like composite 4 from which the container 3 can be produced by folding. The composite 4 comprises at least one polymer outer layer 4_1, which faces the surroundings 2 after formation of the container 3. The polymer outer layer 4_1, which is preferably formed from a thermoplastic polymer, such as polyethylene or polypropylene, is followed by a carrier layer 4_2 which is preferably based on paper or cardboard and which in turn is followed by a barrier layer 4_3. The barrier layer 4_3 is followed by the adhesive layer 4_4, which finally is followed by the polymer inner layer 4_5. In the container 3, this polymer inner layer 4_5 is in direct contact with the foodstuff.

Figure 5:
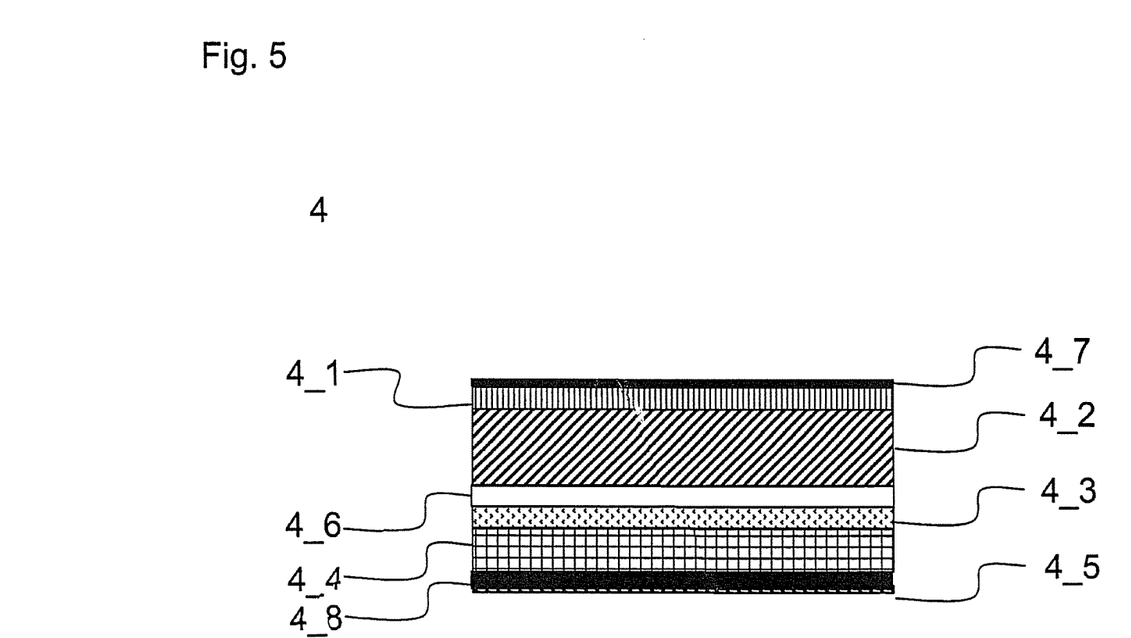

FIG. 5 shows the preferred layered structure of the sheet-like composite 4 from which the container 3 can be produced by folding. The composite 4 also comprises, in addition to the layers shown in FIG. 6, a printed layer 4_7 applied to the polymer outer layer 4_1 and a laminating layer 4_6 provided between the carrier layer 4_2 and the barrier layer 4_3. This laminating layer 4_6, which is preferably based on thermoplastic polymers, such as polyethylene or polypropylene, is provided in particular if a metal foil, such as, for example, aluminium foil, is employed as the barrier layer 4_3. A further thermoplastic layer 4_8, preferably of LLDPE, is furthermore also provided between the adhesive layer 4_4 and the polymer inner layer 4_5. In a further embodiment example, it is preferable for the thermoplastic layer 4_8 to consist of LDPE or comprise this.

Figure 6:
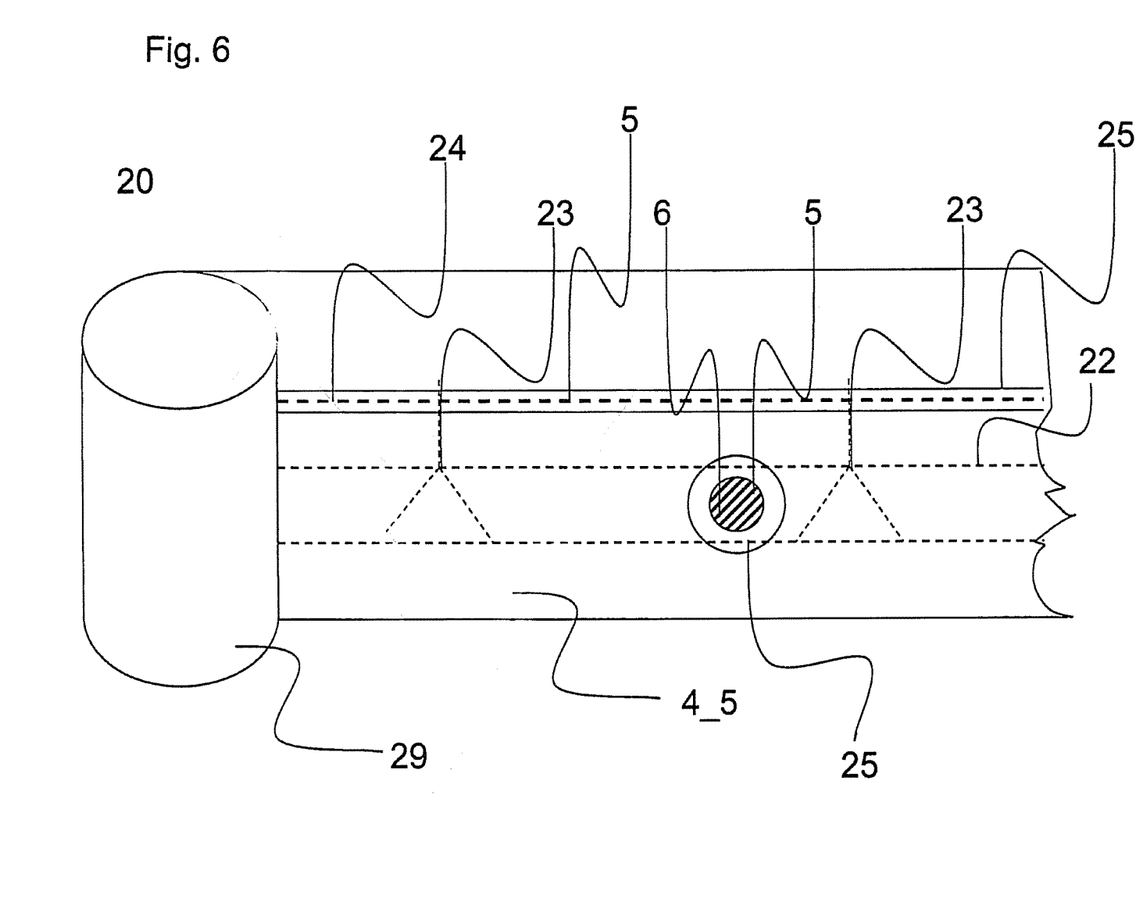

FIG. 6 shows a diagram of a roll web 20 from a roll 29. Scores 22 intersecting at scored crosses 23 are provided in this. The roll web 20 furthermore has a perforation 24 which is formed from a plurality of covered holes 5 and which has been activated by heat in a region 25 surrounding the perforation 24. The perforation 24 shown horizontally here can also be provided in the vertical direction. The region 25 which has been activated by heat differs in its maximum transmission intensity from the regions of the polymer inner layer 4_5 adjacent to the region 25. Furthermore, the roll web 20 has a hole 5 with hole-covering layers 6 which have been subjected to heat treatment in a region 25. Here also, this differs in its maximum transmission intensity from the regions of the polymer inner layer 4_5 which are adjacent to the region 25.

Figure 7:
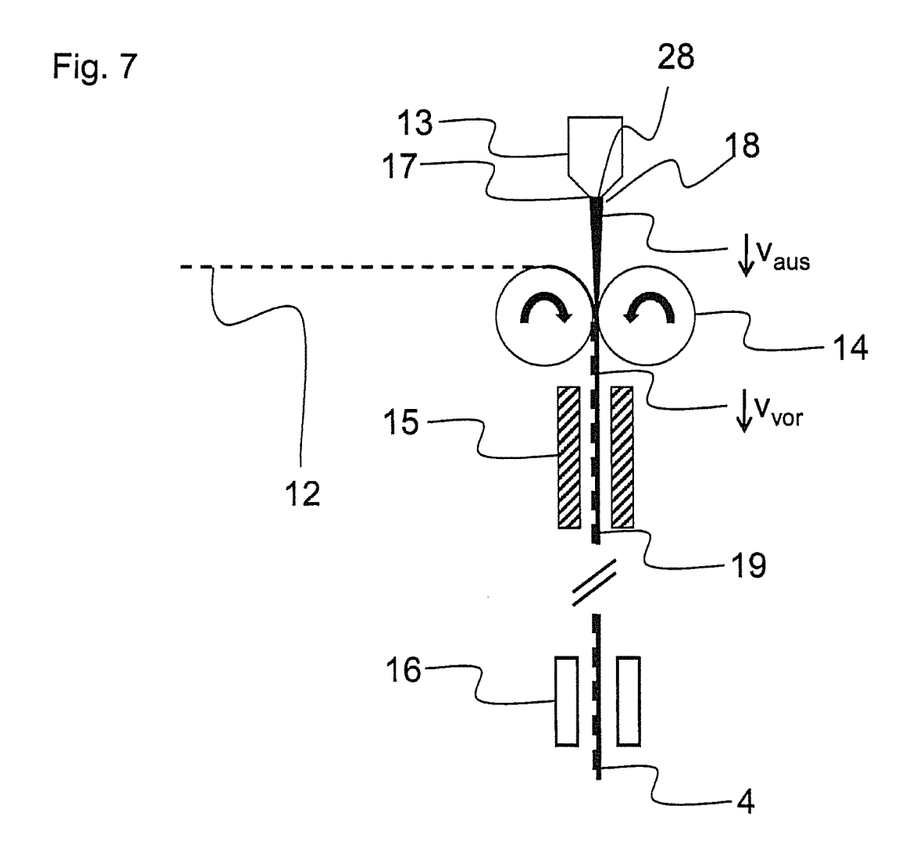

FIG. 7 shows a diagram of the process according to the invention relating to application of the adhesive layer and/or the polymer inner layer. A composite precursor 12 is driven by a roll pair 14 continuously between this roll pair 14 and is thus continuously passed under a melt extruder 13. From the melt extruder 13, a melt of that thermoplastic polymer from which the adhesive layer 4_4 or the polymer inner layer 4_5 is formed is discharged with the exit speed $V_{exit}$ from the extruder slot 28 with an exit thickness 18 determined by the slot width 17. It arrives at the surface of the composite precursor 12. If the melt is the adhesive layer 4_4, this is applied to the side of the barrier layer 4_3 of the composite precursor 12 facing away from the carrier layer 4_2, with a layer thickness 19. If the melt is the polymer inner layer 4_5, this is applied to the adhesive layer 4_4. As a result of the composite precursor 12 being moved relative to the extruder slot 28 at a speed $V_{adv}$ which is greater than $V_E$, during application of the adhesive layer 4_4 or the polymer inner layer 4_5 a stretching of the melt layer in the monoaxial direction and consequently a monoaxial orientation of the polymer chains in this layer occur. FIG. 7 also shows that by the stretching, a significant reduction in the layer thickness of the melt layer occurs from the region of exit from the melt extruder to the melt layer applied to the composite precursor.

After the adhesive layer or the polymer inner layer has been applied in the manner described above in the monoaxially stretched form as a melt layer, the composite obtained in this way can be cooled for the purpose of thermofixing of the stretched melt layer, for example by contact with a temperature-controlled surface 15.

If both the adhesive layer 4_4 and the polymer inner layer 4_5 are to be applied as a stretched melt layer by the process described above, the process described above is carried out first with the adhesive layer 4_4 and then with the polymer inner layer 4_5.

In order at least to reduce the orientation of the polymer chains in the adhesive layer 4_4 and/or the polymer inner layer 4_5 at least in the regions of the hole-covering layers 6 spanning the hole or the holes in the sheet-like composite 4, the composite can also be heated by means of suitable heating devices 16, in particular in the hole regions.

Figure 8:
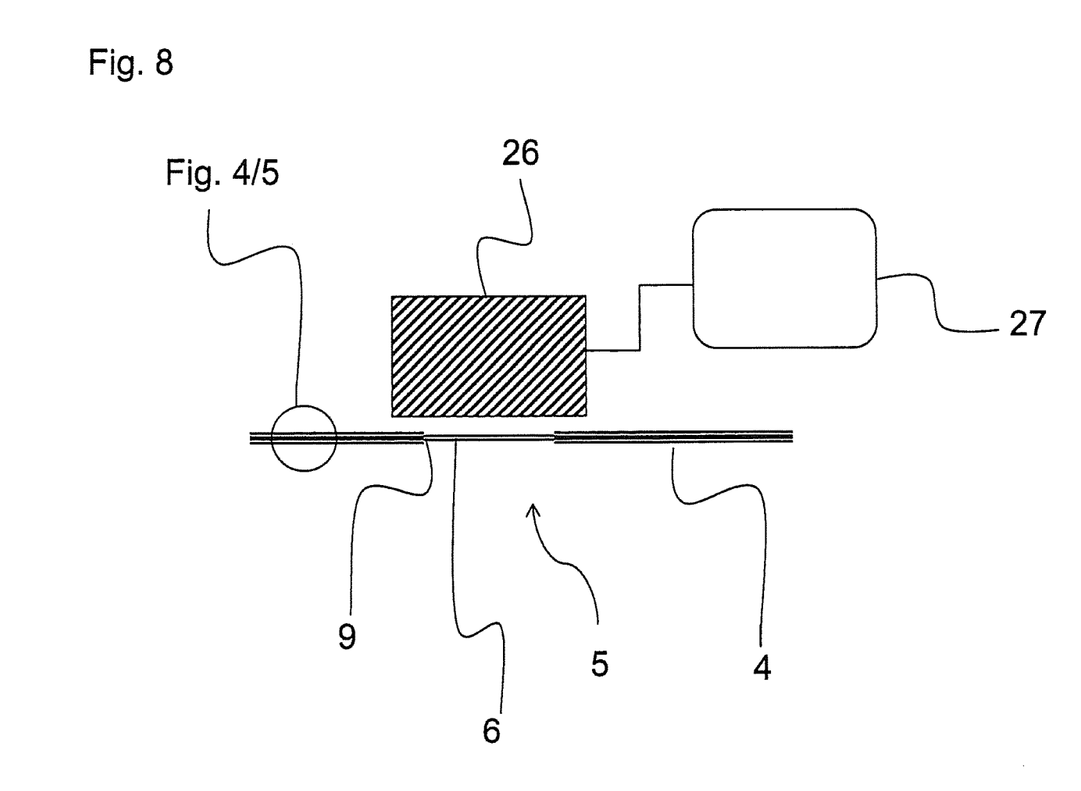

FIG. 8 shows a sheet-like composite 4 which has, for example, the structure shown in FIGS. 4 and 5. In the region of the hole 5 closed with the hole-covering layers 6 which is surrounded by the hole edge 9, an inductor 26 is provided, which heats the hole-covering layer 6 and an edge region of the sheet-like composite 4 around the hole edges 9 by electromagnetic induction via a high frequency generator 27.

LIST OF REFERENCE SYMBOLS

1 Interior
2 Surroundings
3 Container
4 Sheet-like composite
4_1 Polymer outer layer
4_2 Carrier layer
4_3 Barrier layer
4_4 Adhesive layer
4_5 Polymer inner layer
4_6 Laminating layer
4_7 Printed layer
4_8 Further thermoplastic layer
5 Hole
6 Hole-covering layers
7 Closure
8 Opening means
9 Hole edge
10 Joint
11 Perforation
12 Composite precursor
13 Melt extruder
14 Roll pair
15 Cooling surface
16 Heating device
17 Slot width
18 Exit thickness
19 Layer thickness
20 Roll web
21 Treatment region
22 Score
23 Scored cross
24 Perforation
25 Heat-treated region
26 Inductor
27 High frequency generator
28 Extruder slot
29 Roll

The invention claimed is:

1. A process for the production of a container that delimits a container interior from the surroundings and that is formed at least in part from a sheet-like composite, comprising the process steps:
(I) providing a sheet-like composite on a roll;
(II) forming the container from the sheet-like composite from the roll; and
(III) closing the container;
wherein the sheet-like composite comprises:
  (i) a polymer outer layer facing the surroundings;
  (ii) a carrier layer following the polymer outer layer in the direction of the container interior;
  (iii) a barrier layer following the carrier layer in the direction of the container interior;
  (vi) an adhesive layer following the barrier layer in the direction of the container interior; and
  (v) a polymer inner layer following the adhesive layer in the direction of the container interior;
wherein the sheet-like composite is obtained on a roll by a process comprising the process steps:
  (a) providing a composite precursor containing at least the carrier layer;
  (b) applying the adhesive layer and the polymer inner layer by laminating extrusion to the composite precursor; and
  (c) rolling up the sheet-like composite on the roll;
  wherein at least the polymer inner layer, at least the adhesive layer, or at least both are stretched during the application to produce a stretched polymer layer,
  wherein the carrier layer has a hole that is covered at least with the barrier layer, the adhesive layer and the polymer inner layer as hole-covering layers, and
  wherein at least one of the hole-covering layers comprising a stretched polymer layer is subjected to heat treatment.

2. The process according to claim 1, wherein the heat treatment is carried out before the formation of the container in accordance with process step (II).

3. The process according to claim 1, wherein the heat treatment is carried out by hot gas, ultrasound, of microwaves or a combination thereof.

4. The process according to claim 1, wherein the treatment is carried out before the provision of the composite on a roll in accordance with process step (I).

5. The process according to claim 1, wherein the heat treatment is carried out by electromagnetic induction.

6. The process according to claim 1, wherein the maximum transmission intensity of at least one of the hole-covering layers comprising a stretched polymer layer differs before and after the heat treatment.

7. The process according to claim 6, wherein the at least one hole-covering layer is the polymer inner layer.

8. The process according to claim 1, wherein the stretching is a melt stretching.

9. The process according to claim 8, wherein the stretching comprises:
emergence at least of the polymer inner layer, at least of the adhesive layer, or at least both as at least one melt film via at least one extruder slot with an exit speed $V_{exit}$; and
application of the at least one melt film to the composite precursor moving relative to the at least one extruder slot with a moving speed $V_{adv}$; where $V_{exit} < V_{adv}$.

10. The process according to claim 9, wherein $V_{adv}$ is greater than $V_{exit}$ by a factor in the range of from 5 to 200.

11. The process according to claim 1, wherein the carrier layer is made of paper or cardboard.

12. The process according to claim 1, wherein the barrier layer is a metal foil or a metallized film.

13. The process according to claim 1, wherein the adhesive layer forms chemical bonds with the barrier layer.

14. The process according to claim 1, wherein the hole is provided with a closure which perforates the hole-covering layers during opening.

15. The process according to claim 1, wherein the container is filled with a foodstuff before closing.

16. A container obtained by the process according to claim 1.

* * * * *